Jan. 15, 1957  H. W. ADAMS, JR  2,777,989
DEVICES FOR TESTING CAPACITORS
Filed April 23, 1953

INVENTOR
HENRY W. ADAMS, JR.
BY HIS ATTORNEYS
Howson & Howson

United States Patent Office 2,777,989
Patented Jan. 15, 1957

---

2,777,989

DEVICES FOR TESTING CAPACITORS

Henry W. Adams, Jr., Darby, Pa.

Application April 23, 1953, Serial No. 350,739

5 Claims. (Cl. 324—60)

This invention relates to devices for testing capacitors to determine capacitance and/or efficiency thereof. In the past, various devices have been proposed for the testing of capacitors, principally for determining the capacitance thereof. Various forms of bridge-type testing devices have been employed, usually in the form of a Wheatstone bridge, and such devices operate on the principle of comparison or balance of reactances. Such devices are costly and they are also subject to change of values of the elements in the bridge circuit. Other devices have been proposed which operate by measurement of charging or discharging current, but such devices have been objectionable for one reason or another and as far as is known they have never gone into commercial use.

The principal object of the present invention is to provide a simple and inexpensive system which will give accurate and direct indication of the capacitance of a capacitor being tested.

Another object of the invention is to provide such a system having provision for determining the efficiency of a capacitor under test.

In a system according to this invention, unidirectional current pulses are supplied to a capacitor under test, and during the intervals between such pulses, discharge current from the capacitor is caused to flow through a discharge circuit including a current meter. A grid-controlled electron tube is included in the discharge circuit to conduct discharge current therein, and an arrangement is provided for applying a cut-off potential to the grid of said tube only during the charging pulses so as effectively to open the discharge circuit during the charging pulses. A further feature resides in the provision of a current meter in the charging circuit to enable determination of the efficiency of the capacitor.

Figure 1:
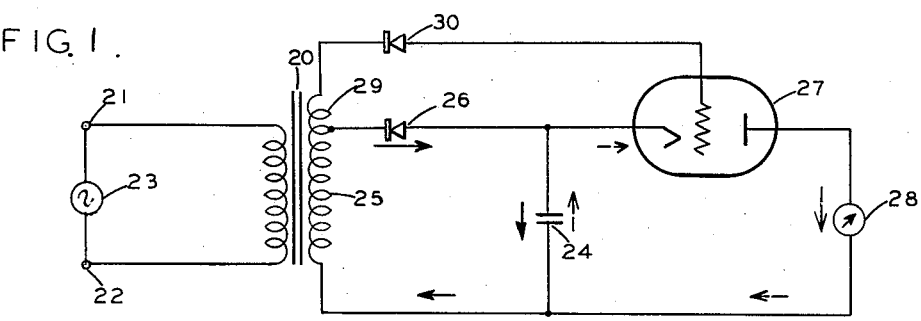
Figure 2:
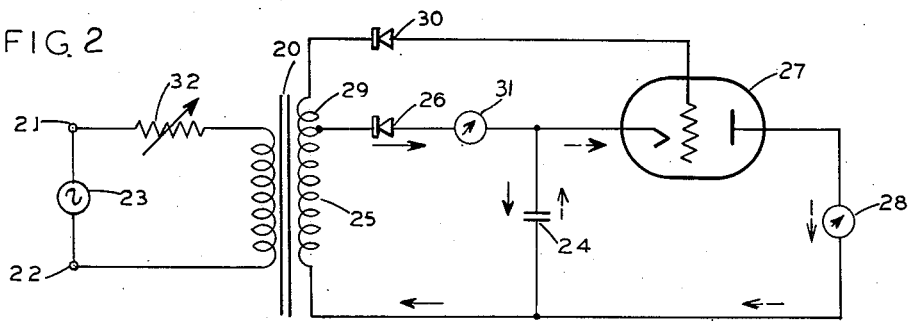
Figure 3:
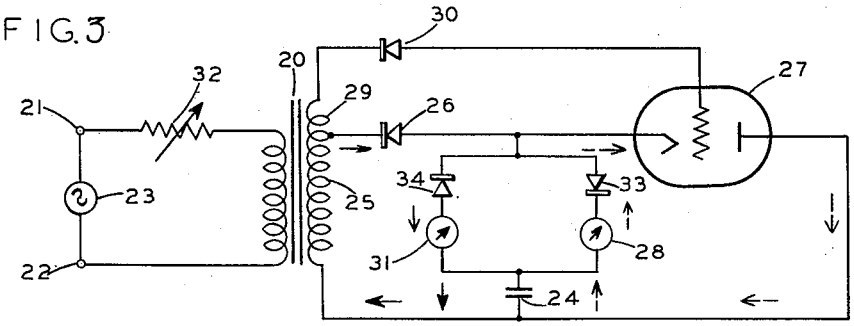

The invention may be clearly understood by reference to the accompanying drawing, in which Fig. 1 is a diagrammatic illustration of one form of the system provided by the invention;

Fig. 2 is a similar illustration of the system adapted for determination of efficiency as well as capacitance; and Fig. 3 illustrates a modification of the latter system.

Referring first to Fig. 1, the system shown has an alternating current source of known frequency 23 connected to the input terminals 21 and 22 of the primary winding of transformer 20. If desired a tapped primary may be used for the testing of capacitors of different voltage ratings. The capacitor of unknown value 24 to be tested is connected across portion 25 of the transformer secondary through a unidirectionally conductive device 26. A discharging circuit for the capacitor 24 extends through a grid-controlled electron tube 27 which may take the form of a simple triode tube, and through a current meter 28. The control grid of tube 27 is connected to the upper end of the transformer secondary so that grid voltage is derived from the portion 29 of the secondary. A unidirectionally conductive device 30 serves to prevent flow of current in the grid circuit.

In operation of this system, during the alternate half cycles of the alternating supply source when the lower end of the transformer secondary is positive and the upper end thereof is negative, charging current flows through the charging circuit as indicated by the solid line arrows, and at the same time, the grid of tube 27 is driven sufficiently negative wtih respect to the cathode to cut off the tube. During the other half cycles, when the lower end of the transformer secondary is negative and the upper end thereof is positive, current is prevented from flowing to the capacitor 24 due to the one way action of device 26, and the grid of tube 27 is driven positive to enhance conduction of the tube. Accordingly, during these alternate half cycles, discharge current flows from the capacitor 24 through tube 27 and meter 28 as indicated by the broken line arrows. Device 30 prevents current flow in the grid circuit.

From the foregoing, it will be seen that unidirectional current pulses are supplied to the capacitor 24 to effect charging thereof while the discharge circuit is maintained open by the cut-off condition of tube 27, and during the time intervals between the charging pulses, discharge current flows from the capacitor through the meter 28. The capacitance of the unknown capacitor determines the current amplitude of the pulses to be measured. Thus, the magnitude of the discharge current flowing through meter 28 is proportional to the energy stored in the capacitor which, in turn, is proportional to the capacitance of the capacitor. Accordingly, the discharge current is proportional to the capacitance of the capacitor and is a measure thereof. With a voltage source of suitable frequency, e. g. 60 cycles per second, the meter indication is continuous due to the rapidity with which the charging and discharging portions of each operating cycle take place. By suitable calibration of the scale of meter 28, the meter may be caused to indicate directly the capacitance of the capacitor under test.

Fig. 2 is identical with Fig. 1 and operates in the same manner, but a current meter 31 is included in the charging circuit for the capacitor under test to enable determination of the efficiency of the capacitor. In an arrangement of this character, it is possible to provide for direct reading of efficiency by making provision for a certain adjustment of the input to the capacitor and by having the scale of meter 28 indicate efficiency. Thus, a mark may be provided on the scale of meter 31, and an input controlling rheostat 32 may be provided to enable adjustment of the input until the pointer of meter 31 is at the fixed mark. With a predetermined fixed input to the capacitor, the efficiency of the capacitor will be a function of the output or discharge current. Therefore, the meter 28 with a scale in terms of efficiency will indicate the efficiency directly.

Fig. 3 shows a modification of Fig. 2 in which the meters 28 and 31 are arranged as shown in parallel branches, and unidirectionally conductive devices 33 and 34 are provided so that only charging current will flow through meter 31 and only discharge current will flow through meter 28.

In any of the systems above-described, the undirectionally conductive devices employed may be any known device which operates as an electrical check valve. Thus, these devices may be selenium rectifiers or diodes. In a physical embodiment of the system which was operated experimentally selenium rectifiers were used and a type 2A3 triode was used.

While the invention has been described with reference to certain embodiments, it is not limited thereto but contemplates such modifications or other embodiments as may occur to those skilled in the art.

I claim:

1. In a system for testing capacitors, a charging circuit for a capacitor to be tested, a current meter in said charging circuit means for producing time-spaced current pulses of only one polarity in said charging circuit, a discharge circuit for said capacitor, a current meter in said discharge circuit, and means for preventing current flow in said discharge circuit during said pulses and permitting current flow in the discharge circuit during intervals between said pulses.

2. In a system for testing capacitors, a charging circuit for a capacitor to be tested, a current meter in said charging circuit, means for producing time-spaced current pulses of only one polarity in said charging circuit, a discharge circuit for said capacitor, a current meter in said discharge circuit, a grid-controlled electron tube serially included in said discharge circuit to conduct discharge current from said capacitor to said meter, and means for applying a cut-off potential to the grid of said tube only during the charging pulses, thereby effectively to open said discharge circuit during the charging pulses.

3. In a system for testing capacitors, a transformer having a primary winding and secondary winding, means to connect said primary winding to a source of alternating voltage, a charging circuit for a capacitor to be tested connected across a part of said secondary winding, a current meter in said charging circuit, a unidirectionally conductive device serially included in said charging circuit to effect flow of time-spaced current pulses of only one polarity to said capacitor, a discharge circuit for said capacitor, a current meter in said discharge circuit, a grid-controlled electron tube serially included in said discharge circuit to conduct discharge current from said capacitor to the last-mentioned meter, and means connecting another part of said secondary winding to the grid of said tube to apply a cut-off potential to the grid only during the charging pulses, thereby effectively to open said discharge circuit during the charging pulses.

4. In a system for measuring capacitance, an alternating current source of known constant frequency, a transformer having primary and secondary windings, means connecting said primary winding across said source, a charging circuit for a capacitor of unknown capacitance to be measured connected across a portion of said secondary winding, a unidirectionally conductive device in said charging circuit to effect flow of time-spaced current pulses of only one polarity to said capacitor, a discharge circuit for said capacitor, a current meter in said discharge circuit, a controllable electronic switch device included in said discharge circuit to conduct discharge current from said capacitor through said meter, the amplitude of said discharge current being proportional to the unknown capacitance of said capacitor, and means connecting another part of said secondary winding to a control element of said electronic switch device to render said device non-conductive during the charging pulse intervals.

5. In a system for measuring the capacitance of an unknown capacitor an alternating-current source of known frequency, a transformer having a primary winding and secondary winding, means connecting said source across said primary winding, a charging circuit for a capacitor to be measured, said charging circuit having one side connected to one end of said secondary winding and the other side connected to an intermediate point of said secondary winding, a unidirectionally conductive device included in said charging circuit to effect flow of current pulses therein only during alternate half-cycles of the alternating-current source, a discharge circuit for said capacitor, a current meter in said discharge circuit, a grid-controlled electron tube serially included in said discharge circuit and having its anode connected to the first-mentioned side of said charging circuit and having its cathode connected to the other side of said charging circuit, and a connection between the other end of said secondary winding and the control grid of said tube for biasing said tube to cut off during said charging pulse periods, said tube being conductive during the intervals between charging pulses to conduct the capacitor discharge current through said meter, the amplitude of said discharge current being proportional to the capacitance of the unknown capacitor.

References Cited in the file of this patent
UNITED STATES PATENTS

| | | |
|---|---|---|
| 1,906,466 | Haskins | May 2, 1933 |
| 2,137,859 | Schwartz et al. | Nov. 22, 1938 |
| 2,408,727 | Blitz | Oct. 8, 1946 |
| 2,525,046 | Richter | Oct. 10, 1950 |